United States Patent Office 3,786,065
Patented Jan. 15, 1974

3,786,065
N,N-DIMETHYL-O-[ - SUBSTITUTED - 3,4 - POLY-METHYLENE-PYRAZOLYL-(5)]-CARBAMIC ACID ESTERS
Hellmut Hoffmann, Wuppertal-Elberfeld, Ingeborg Hammann, Cologne, and Gunter Unterstenhofer, Opladen, Germany, assignors to Bayer Aktiengesellschaft, Leverkusen, Germany
No Drawing. Filed Aug. 28, 1972, Ser. No. 284,325
Claims priority, application Germany, Sept. 3, 1971, P 21 44 124.7
Int. Cl. C07d 49/36
U.S. Cl. 260—310 R   8 Claims

ABSTRACT OF THE DISCLOSURE

N,N - dimethyl - O - [1-substituted-3,4-polymethylenepyrazolyl-(5)]-carbamic acid esters of the formula:

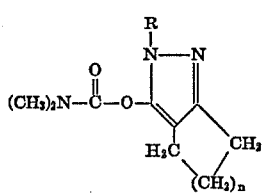

in which

R is an alkyl radical with up to 6 carbon atoms optionally substituted by a nitrile group, and
n is 1 or 2, which possess insecticidal properties.

The present invention relates to and has for its objects the provision of particular new N,N-dimethyl-O-[1-substituted-3,4-polymethylene - pyrazolyl - (5)] - carbamic acid esters, i.e., N,N-dimethyl-O-[1-alkyl-or-cyanoalkyl-3,4-tri- or tetramethylenepyrazolyl-(5)]-carbamic acid esters, which possess insecticidal properties, active compositions in the form of mixtures of such compounds with solid and liquid dispersible carrier vehicles, and methods for producing such compounds and for using such compounds in a new way especially for combating insects, with other and further objects becoming apparent from a study of the within specification and accompanying examples.

It is already known from Swiss patent specification 282,655 that pyrazolylcarbamic acid esters, such as N,N-dimethyl-O-(1 - isopropyl - 3 - methylpyrazolyl-(5))-carbamic acid ester (Compound A), possess insecticidal properties.

The present invention provides N,N-dimethyl-O-pyrazolylcarbamic acid esters of the formula:

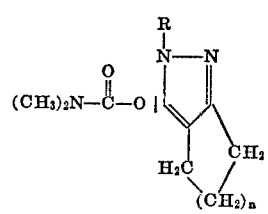

in which

R is an alkyl radical with up to 6 carbon atoms optionally substituted by a nitrile group, and
n is 1 or 2.

Preferably, R is a lower alkyl radical with up to 4 carbon atoms or a cyanoethyl radical, and n is 1.

Surprisingly, the N,N-dimethyl - O - pyrazolylcarbamic acid esters according to the invention possess a substantially better insecticidal, particularly contact-insecticidal, activity than the previously known compounds of analogous constitution and of the same direction of activity. Also to be emphasized is the very good systemic lasting effect and the lasting effect after spraying. The substances according to the invention therefore represent a genuine enrichment of the art.

The invention also provides a process for the production of a N,N-dimethyl-O-pyrazolylcarbamic acid ester of the Formula I in which a pyrazole derivatives of the formula:

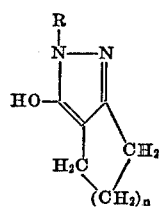

in which

R and n have the meanings stated above, (a) is reacted, in the form of an alkali metal, alkaline earth metal or ammonium salt or in the presence of an acid acceptor, with N,N-dimethylcarbamic acid chloride of the formula

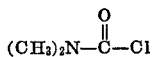  (III)

or (b) is converted with an excess of phosgene into the corresponding chloroformic acid ester and the latter is reacted with dimethylamine, or (c) is reacted with an equivalent amount of phosgene to give the corresponding bis-(pyrazolyl)-carbonate and the latter is split with dimethylamine.

If N,N-dimethylcarbamic acid chloride and 1-methyl-3,4-trimethylene-5-hydroxypyrazole are used as starting materials, the course of reaction (a) can be represented by the following formula scheme:

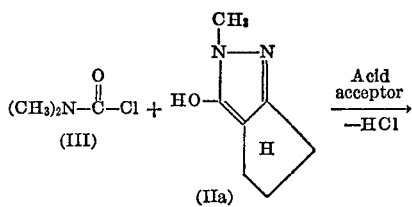

The N,N-dimethylcarbamic acid chloride (III) to be used in process variant (a) is known and can be prepared according to known processes.

The pyrazole derivatives of the Formula II can be prepared by reacting the known hydrazine derivatives of the general formula:

R—NH—NH$_2$  (V)

in which

R has the meaning stated above, with cyclic ketone derivatives of the general formula:

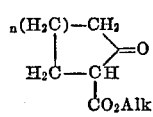  (VI)

in which n has the meaning stated above, and

Alk is an alkyl radical with up to 6 carbon atoms, and treating the product with an alcoholate.

The process of the invention is preferably carried out in the presence of a solvent or diluent. As such, practically all inert organic solvents are suitable. These include, above all, aliphatic and aromatic optionally chlorinated hydrocarbons, such as benzene, toluene, xylene, benzine, methylene chloride, chloroform, carbon tetrachloride, chlorobenzene; ethers, such as diethyl ether, dibutyl ether, dioxane; ketones, such as acetone, methylethyl ketone, methylisopropyl ketone, methylisobutyl ketone; and nitriles, such as acetonitrile and propionitrile.

As acid acceptors, all customary acid-binding agents can be used. Particularly good results have been obtained with alkali metal carbonates and alcoholates, such as sodium and potassium carbonate, methylate or ethylate; or aliphatic, aromatic or heterocyclic amines, for example triethylamine, dimethylamine, dimethylaniline, dimethylbenzylamine and pyridine.

The reaction temperature can be varied within a fairly wide range. In general, the reaction is carried out at about 0 to 150° C., preferably about 30° to 70° C.

The reaction is, in general, carried out at normal pressure.

When carrying out the processes according to the invention, the starting materials are, in general, used in equivalent amounts, except in process variant (b), where phosgene is used in excess.

In the first step of process variant (b), the reaction is preferably carried out at a pH value below 7. In the first step of process variant (c), the reaction is preferably carried out at a pH value of approximately 8.

The working up of the reaction mixture may be effected in customary manner.

The substances according to the invention are obtained in most cases in the form of slightly colored oils which cannot be distilled without decomposition but can, by longer heating to moderately elevated temperatures under reduced pressure, be freed from the last volatile components and can in this way be purified. For their characterization, the refractive index is particularly useful but, if the compounds are obtained in crystalline form, then the melting point serves for their characterization.

As already mentioned, the new N,N-dimethyl-O-pyrazolyl-carbamic acid esters are distinguished by an outstanding insecticidal (especially contact-insecticidal) effectiveness against crop pests. Also to be emphasized is the very good lasting effect of the substances according to the invention. They possess a good activity against both sucking and eating insects.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sapphaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein above all there should be mentioned buterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Piersis brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Maderia cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vingar fly (*Drosophila melanogaster*), the Mediterranean fruit fly (*Ceratitis capitata*), the house fly (*Musca domestica*), the little house fly (*Fannia cancicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalene, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl, isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, or acaricides, rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most above a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, which comprise applying to at least one of correspondingly (a) such insects, and (b) the corresponding habitat thereof, i.e., the locus to be protected, a correspondingly combative or toxic amount, i.e., an insecticidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Myzus test (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 1:

TABLE 1.—MYZUS TEST

| Active Compound | Concentration of active compound in percent | Degree of destruction in percent after 1 day |
|---|---|---|
| $(CH_3)_2N-CO-O-$ [pyrazole ring with $CH_3$ at C-position and $(CH_3)_2CH$ on N] (known) (A) | 0.1<br>0.01 | 100<br>0 |
| $(CH_3)_2N-CO-O-$ [cyclopentene-fused pyrazole with $CH_3$ on N] | 0.1<br>0.01<br>0.001 | 100<br>98<br>35 |
| $(CH_3)_2N-CO-O-$ [cyclopentene-fused pyrazole with $NC-CH_2-CH_2$ on N] | 0.1<br>0.01<br>0.001 | 100<br>100<br>80 |
| $(CH_3)_2N-CO-O-$ [cyclohexene-fused pyrazole with $CH_3$ on N] | 0.1<br>0.01 | 100<br>99 |
| $(CH_3)_2N-CO-O-$ [cyclohexene-fused pyrazole with $NC-CH_2-CH_2$ on N] | 0.1<br>0.01<br>0.001 | 100<br>100<br>95 |
| $(CH_3)_2N-CO-O-$ [cyclohexene-fused pyrazole with $i-H_7C_3$ on N] | 0.1<br>0.01<br>0.001 | 100<br>99<br>95 |
| $(CH_3)_2N-CO-O-$ [cyclopentene-fused pyrazole with $i-H_7C_3$ on N] | 0.1<br>0.01<br>0.001 | 100<br>100<br>99 |

EXAMPLE 2

Myzus test (lasting effect after spraying)

Solvent: 3 parts by weight dimethylformamide
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Cabbage plants (*Brassica oleracea*) which have a height of approximately 10–15 cm. are sprayed with the preparation of the active compound until dripping wet.

After the specified periods of time, the plants are infested with aphids (*Myzus persicae*). After 3 days in each case, the degree of destruction is determined as a percentage. 100% means that all the aphids were killed; 0% means that none of the aphids were killed.

The active compounds, the concentrations of the active compounds, the evaluation times and the results can be seen from the following Table 2:

each case, determined after 3 days. 100% means that all the aphids were killed; 0% means that none of the aphids were killed.

TABLE 2.—LASTING EFFECT AFTER SPRAYING

| Active compound concentration 0.05% | Percent destruction after days— | | | | | | | | | | |
|---|---|---|---|---|---|---|---|---|---|---|---|
| | 1 | 4 | 8 | 11 | 15 | 18 | 22 | 25 | 29 | 32 | 36 |
| (CH₃)₂N—CO—O—[pyrazole with CH₃ and (CH₃)₂CH] (known) (A) | 100 | 0 | | | | | | | | | |
| (CH₃)₂N—CO—O—[cyclopenta-fused pyrazole with NC—CH₂—CH₂] | 100 | 100 | 100 | 100 | 100 | 100 | 100 | 95 | 100 | 75 | ¹100 |

¹ Test discontinued.

The active compounds, concentrations of active compound, evaluation times and results can be seen from the following Table 3:

TABLE 3.—SYSTEMIC LASTING EFFECT

| Active compound | Mg. active compound ¹ | Percent destruction after days | | | | | | | | | |
|---|---|---|---|---|---|---|---|---|---|---|---|
| | | 13 | 17 | 20 | 24 | 27 | 31 | 38 | 41 | 45 | 48 |
| (CH₃)₂N—CO—[pyrazole with CH₃ and (CH₃)₂CH] (known) | 12.5 | 100 | 35 | 45 | 40 | 10 | | | | | |
| (CH₃)₂N—CO—O—[cyclopenta-fused pyrazole with NC—CH₂—CH₂] | 12.5 | 100 | 100 | 100 | 100 | 100 | 100 | 100 | 100 | 100 | ²100 |

¹ To 100 grams soil (weighed air-dry).
² Test discontinued.

EXAMPLE 3

Myzus test (lasting systemic effect)

Solvent: 3 parts by weight acetone
Emulsifier: 1 part by weight alkylarylpolyglycol ether To produce a suitable preparation of active compound, 1 part by weight of active compound is mixed with the stated amount of solvent which contains the stated amount of emulsifier, and the concentrate is diluted with water to the desired concentration of 0.025% of active compound.

Cabbage plants (*Brassica oleracea*) are watered with, in each case, 50 ml. of the preparation of active compound so that the preparation of active compound penetrates into the soil without wetting the leaves of the cabbage plants. The active compound is taken up by the cabbage plants from the soil and so reaches the leaves. There are applied 12.5 mg. of active compound to 100 g. of soil (weighed air-dry).

After the times stated, the plants are infested with peach aphids (*Myzus persicae*) and their mortality is, in

EXAMPLE 4

Preparation of the pyrazole derivatives used as starting materials:

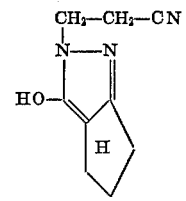

(IIb)

57 g. (0.4 mole) of 2-carbomethoxycyclopentanone were added to 34 g. (0.4 mole) of 2-cyanoethylhydrazine; the temperature rose to 60° C. The mixture was left to stand for one hour, 100 ml. of benzene were added; filtration over sodium sulfate was effected, followed by boiling at 80–90° C. under reflux for 6 hours. Thereafter, the solvent was distilled off. 0.4 mole of sodium methoxide was added and boiling under reflux was effected for a further 4 hours. 200 ml. of water were added to the reaction solution; neutralization was effected with 0.4 mole of glacial acetic acid. The pyrazole derivative then crystallized out while cooling. For purification, recrystallization from acetonitrile was effected and 29 g. (41% of theory) of 1-cyanoethyl-3,4-trimethylene-5-hydroxy-pyrazole (IIb) with the melting point 169–171° C. were obtained.

Analogously, the following compounds were prepared:

| Constitution | Physical properties, °C. | Yield (percent of theory) |
|---|---|---|
| (IIa) CH₃/N—N/HO—/H | 155 | 35 |
| (IIc) CH₂—CH₂—CN/N—N/HO—/H | 179–180 | 58 |
| (IId) CH₃/N—N/HO—/H | 99–101 | 66 |
| (IIe) CH(CH₃)₂/N—N/HO—/H | 151 | 45 |
| (IIf) CH(CH₃)₂/N—N/HO—/H | 178 | 46 |

EXAMPLE 5

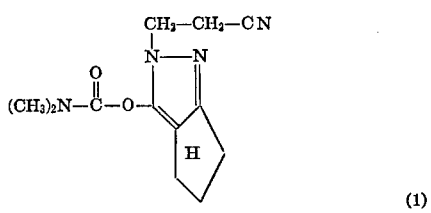

(1)

32 g. of dimethylcarbamic acid chloride were added, with stirring, to 53 g. (0.3 mole) of 1-cyanoethyl-3,4-trimethylene-5-hydroxypyrazole (IIb) and 45 g. of potassium carbonate in 300 ml. of acetonitrile, and stirring at 50° C. was effected overnight. The reaction solution was poured into water and extracted with benzene. The organic phase, after washing with water, was dried and the solvent was distilled off. There remained behind a crystalline residue which was triturated with ligroin. 64 g. (88% of theory) of N,N - dimethyl - O - [1-cyanoethyl-3,4-trimethylene-pyrazolyl-(5)]-carbamic acid ester with the melting point 109° C. were obtained.

In analogous manner the following compounds were prepared:

| Constitution | | Physical properties | Yield (percent of theory) |
|---|---|---|---|
| 2 | CH₃/N—N/(CH₃)₂N—C(O)—O—/H | 58 | 86 |
| 3 | CH₂—CH₂—CN/N—N/(CH₃)₂N—C(O)—O—/H | $n_D^{27}=1.5200$ | 77 |
| 4 | CH₃/N—N/(CH₃)₂N—C(O)—O—/H | $n_D^{27}=1.5132$ | 72 |
| 5 | CH(CH₃)₂/N—N/(CH₃)₂N—C(O)—O—/H | $n_D^{27}=1.5112$ | 56 |
| 6 | CH(CH₃)₂/N—N/(CH₃)₂N—C(O)—O—/H | $n_D^{23}=1.5071$ | 78 |

It will be appreciated that the instant specification and examples are set forth by way of illustration and not limitation and that various modifications and changes may be made without departing from the spirit and scope of the present invention.

What we claim is:

1. An N,N-dimethyl-O-[3,4-polymethylene-pyrazolyl-(5)]-carbamic acid ester of the formula:

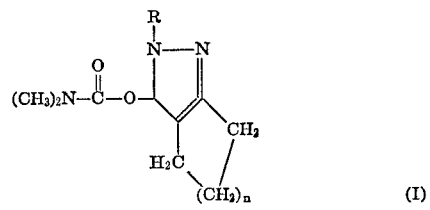

(I)

in which
R is alkyl of up to 6 carbon atoms optionally substituted by a nitrile group, and
n is 1 or 2.

2. A compound according to claim 1 in which R is lower alkyl of up to 4 carbon atoms or cyanoethyl, and n is 1.

3. The compound according to claim 1 wherein such compound is N,N-dimethyl-O-[1-cyanoethyl-3,4-trimethylene-pyrazolyl-(5)]-carbamic acid ester of the formula:

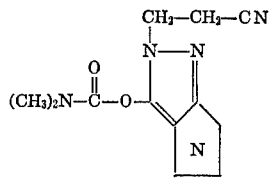

(1)

4. The compound according to claim 1 wherein such compound is N,N-dimethyl-O-[1-methyl-3,4-trimethylene-pyrazolyl-(5)]-carbamic acid ester of the formula:

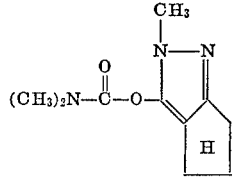

(2)

5. The compound according to claim 1 wherein such compound is N,N-dimethyl-O-[1-cyanoethyl-3,4-tetramethylyl-(5)]-carbamic acid ester of the formula:

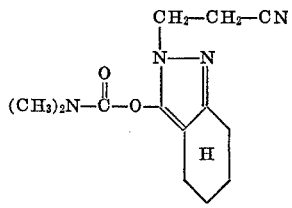

(3)

6. The compound according to claim 1 wherein such compound is N,N-dimethyl-O-[1-methyl-3,4-tetramethylene-pyrazolyl-(5)]-carbamic acid ester of the formula:

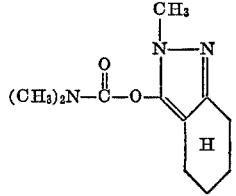

(4)

7. The compound according to claim 1 wherein such compound is N,N-dimethyl-O-[1-isopropyl-3,4-tetramethylene-pyrazolyl-(5)]-carbamic acid ester of the formula:

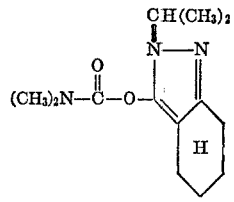

(5)

8. The compound according to claim 1 wherein such compound is N,N-dimethyl-O-[1-isopropyl-3,4-trimethylene-pyrazolyl-(5)]-carbamic acid ester of the formula:

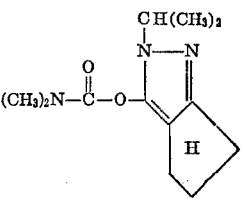

(6)

References Cited

UNITED STATES PATENTS

| | | | |
|---|---|---|---|
| 2,681,915 | 6/1954 | Gysin et al. | 260—310 R |
| 3,637,738 | 1/1972 | Gjchwend et al. | 260—310 R |

FOREIGN PATENTS

| | | | |
|---|---|---|---|
| 69,373 | 10/1969 | East Germany | 260—310 R |
| 844,741 | 7/1952 | Germany | 260—310 R |
| 279,553 | 3/1952 | Switzerland | 260—310 R |

OTHER REFERENCES

Kost et al.: Chem. Abst., vol. 60, column 9284 (1964).
Schlager: Chem. Abst., vol. 61, column 7003 (1964).

NATALIE TROUSOF, Primary Examiner

U.S. Cl. X.R.

424—273